March 7, 1961
R. L. DAVIS
2,974,276
METHOD OF AND APPARATUS FOR USE IN
MEASURING EARTH POTENTIALS
Filed Aug. 16, 1957
3 Sheets-Sheet 1
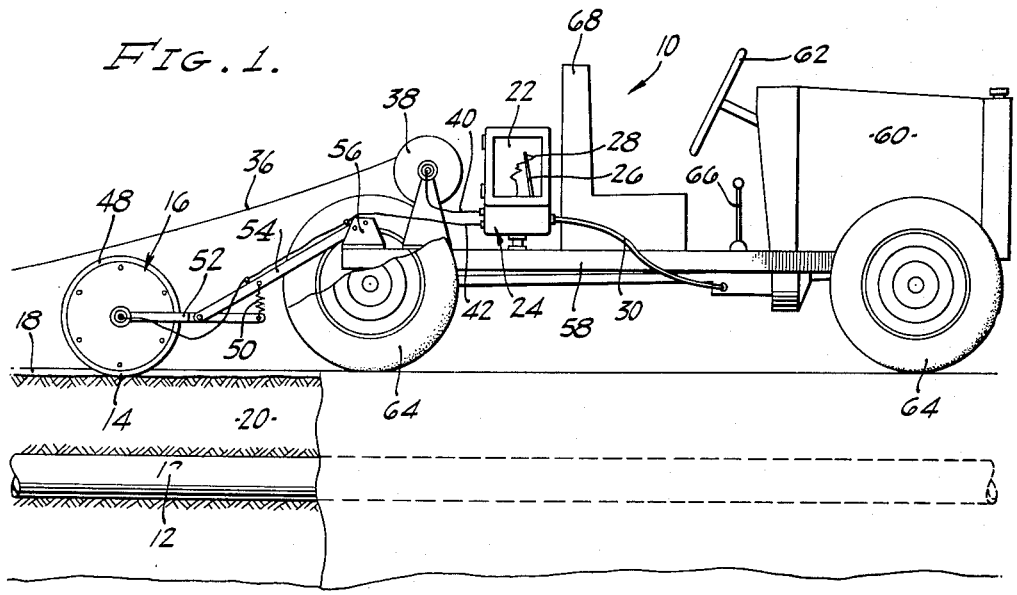
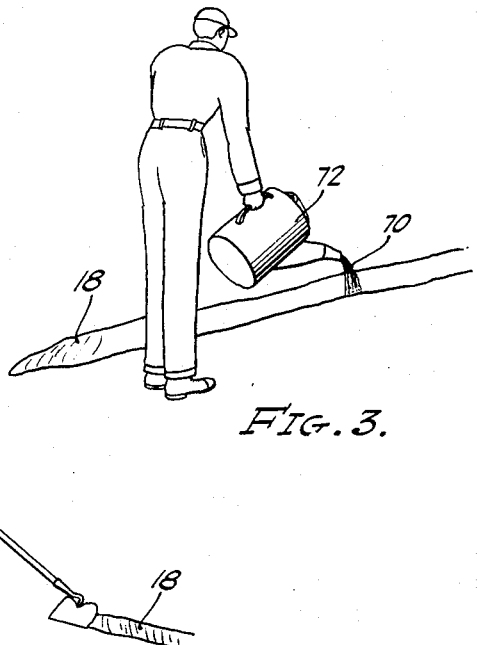
FIG. 2.
FIG. 3.
INVENTOR.
ROBERT L. DAVIS
BY
ATTORNEY March 7, 1961

R. L. DAVIS 2,974,276

METHOD OF AND APPARATUS FOR USE IN
MEASURING EARTH POTENTIALS

Filed Aug. 16, 1957

INVENTOR.
ROBERT L. DAVIS

BY
[signature]
ATTORNEY

March 7, 1961

R. L. DAVIS 2,974,276

METHOD OF AND APPARATUS FOR USE IN MEASURING EARTH POTENTIALS

Filed Aug. 16, 1957

INVENTOR.
ROBERT L. DAVIS
BY
ATTORNEY

United States Patent Office 2,974,276
Patented Mar. 7, 1961

2,974,276

METHOD OF AND APPARATUS FOR USE IN MEASURING EARTH POTENTIALS

Robert L. Davis, Bakersfield, Calif., assignor to The Superior Oil Company, Los Angeles, Calif., a corporation of California Filed Aug. 16, 1957, Ser. No. 678,508

10 Claims. (Cl. 324—29)

This invention relates to methods of and apparatuses for making earth potential surveys, for example, methods of and apparatuses for determining the potential difference between an underground conductor and the surface of the earth above and along the length of the conductor.

Earth potential surveys of this type are performed and graphs made of earth potential versus conductor length in order to evaluate chemical corrosion resistance and other factors and thereby to determine, among other things, the correct steps to be taken in relation to pipe or cable maintenance or replacement. That is, uses of earth potential surveys are not limited to, but may be usefully employed in connection with the maintenance of buried oil or gas pipe or power or telephone cables. The maxima and minima of the earth potential versus conductor length graphs tell much in this regard. For a detailed explanation of several conventional survey methods and apparatuses, and an explanation of the uses of earth potential versus conductor length graphs, see "Earth Potential or Surface Potential Gradient Tests on Buried Cable," Volume 12, No. 8, Corrosion, August 1956, and "Testing Methods and Corrosion Control Measures For Buried Telephone Cable," Volume 13, No. 5, Corrosion, May 1957, by Daniel R. Werner. Also see U.S. Patent Nos. 2,086,737; 2,103,636; 2,123,545; 2,160,671; 2,335,024; and 2,344,672.

If the position of the underground conductor is unknown, it is, of course, conventional to determine its position and the direction in which it runs by the use of an audio-frequency detector coil.

After the conductor position has been determined, in the prior art it has been the practice to make earth potential surveys by a method comprising the steps of connecting one side of a voltmeter to the underground conductor, connecting the other side of the voltmeter to a "roving" cell including means to contact the earth at its surface, then manually pressing the roving cell into contact with the earth's surface at equally spaced test points along and directly above the underground conductor. Voltage readings would then be recorded manually at each point and use made of the graph thereby obtained by drawing straight lines through the voltage readings at the particular test points indicated on the graph. The graphs then could be used for any of the above-described or for other purposes.

As stated previously, many uses of the maxima and minima in the earth potential versus conductor length graphs are made. However, in the point-by-point method of making such graphs, neither a clearly defined nor accurate maximum or minimum can be determined, the accuracy of the method being limited by the spacing between test points. Another serious disadvantage of the prior art method is the fact that it can be conveniently performed only by a human operator, and this is not only hard work but is also a time-consuming procedure.

The present invention overcomes these and other disadvantages of the prior art by providing a wheel to contact the earth and be rolled along and directly above an underground conductor. Thus a continuous and accurate survey may be made by a recording voltmeter in a very expeditious manner.

Wheel electrodes to contact the earth for use with other types of methods and apparatuses are not unknown. For example, see U.S. Patent Nos. 2,243,891; 2,588,561; and 2,632,285. These three patents relate to apparatuses for electrically killing plants, bacteria, and fungi in the ground. However, no wheel electrode has ever been employed in making earth potential surveys of the type above described. In addition, in accordance with the present invention, a very special wheel electrode is provided. This device includes a hollow dielectric wheel having a porous rim to be saturated with an electrolyte contained in the wheel to make electrical contact with the ground. In addition, a metal electrode is supported in the space inside the wheel in a position to be immersed in the electrolyte to provide a good electrical contact with it.

According to a feature of the invention, the wheel electrode of the present invention is provided with an axle and the metal electrode is suspended in the electrolyte simply by hook means to extend around the axle of the wheel, the metal electrode thereby remaining stationary with respect to the wheel in a substantially vertical position while the wheel rotates.

In accordance with one aspect of the invention, it will generally be easier to employ a land vehicle having a wheel electrode to touch the earth, a voltmeter to be carried by the land vehicle having recording means and a record holder, and means to move with the recording means or record holder at a speed proportional to that of the vehicle. However, in accordance with another aspect of the invention, an unusually inexpensive survey apparatus may be constructed of simply a wheel electrode having an axle, a forked member disposed over the wheel and in rotational engagement with the axle, and a handle bar at the upper end of the forked member to guide it manually.

Another feature of the invention resides in the use of variable potential means, for example, a potential source having a potentiometer connected across it, means to record the output voltage of the variable potential means, fixed means to contact an underground conductor, a hollow wheel electrode for rolling contact with the earth over an underground conductor, and a null-seeking servo mechanism responsive to the earth surface contact potential with respect to that of the underground conductor as compared to the output of the potentiometer with respect to the underground conductor, one side of the potentiometer being conventionally grounded thereto. In this case, the servo mechanism would drive the potentiometer itself to a point such that its output voltage would be equal to the earth potential measured. In this case, the earth potential could be measured without drawing ground current.

Still another feature of the invention includes the use of a method of preparing the earth's surface above the underground conductor to be used with the electrode of the invention. This method includes simply the steps of excavating a furrow in the earth along the length of the underground conductor directly above it and filling the furrow with an electrolyte. Thus wheel electrode to earth surface contact may be substantially improved.

It is, therefore, an object of the invention to provide apparatus for making accurate and continuous earth potential surveys.

It is another object of the invention to provide apparatus for making earth potential surveys which may be performed easily and quickly.

Still another object of the invention is to provide a special type of wheel electrode for use in measuring earth potentials.

A further object of the invention is to provide an inexpensive apparatus for making continuous accurate earth potential surveys in a relatively short time.

Yet another object of the invention is to provide a method of measuring the potential difference between spaced points on a line at the surface of the earth and a buried conductor disposed beneath the line continuously as a function of the length of the conductor.

Still a further object of the invention is to provide a method of preparing the earth's surface for conducting earth potential measuring operations.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

Fig. 1 is a side elevational view of mechanized apparatus which may be employed in the performance of the method of the invention;

Figs. 2 and 3 are perspective views of a man performing two steps of a method of the invention which are preferably performed preparatory to making earth potential surveys;

Figure 4:
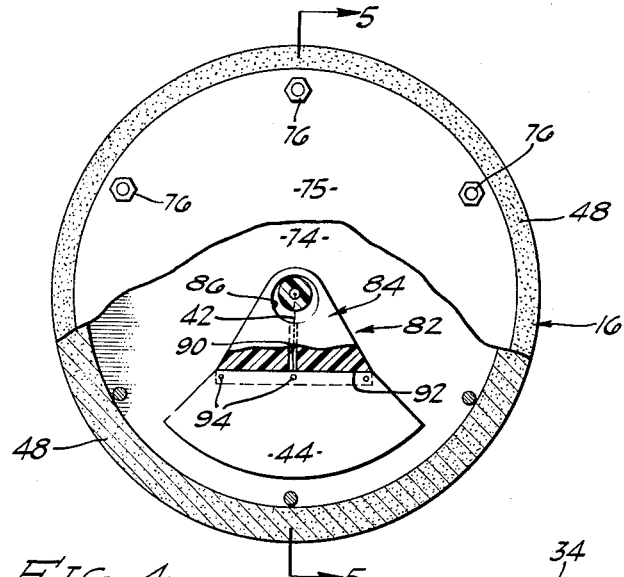
Fig. 4 is a broken-away side elevational view of a wheel electrode employed with the apparatus of the invention shown in Fig. 1.

In the drawings in Fig. 1 a motor vehicle is indicated at 10 having special apparatus thereon to record potential difference between an underground metal pipe 12 and a point 14 of surface contact of a wheel electrode 16 with the earth in a small trench 18 in the earth in line with and disposed directly above the pipe 12. The potential difference between the pipe 12 and the earth 20 is recorded. It may be recorded on any convenient means, but preferably a sheet of paper 22 is provided for this purpose in a recording voltmeter 24. The recording voltmeter 24 is provided with a stylus 26 to ink a curve 28 on the sheet 22. The paper 22 is moved at a rate directly proportional to the speed of the vehicle 10 by means of a speedometer cable connection 30 from a wheel of the vehicle 10 or wheel electrode 16. The amount the stylus 26 moves is then maintained in proportion to the voltage between the pipe 12 and the earths surface.

Figure 6:
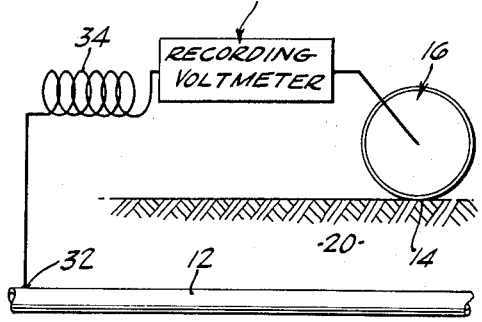
Fig. 6 is a schematic diagram of the electrical circuit employed in accordance with the invention in making earth potential surveys.

Electrical contact is made with the pipe 12 at a point 32 as shown in Fig. 6. Loops of a coil 34 are then unreeled from the vehicle 10 at 36 shown in Fig. 1 from a drum 38 which is rotatably mounted on the rear of the vehicle 10. The opposite end of the wire indicated at 36 in Fig. 1 is connected to the voltmeter 24 at a lead 40. The other side of the voltmeter at 42 is then connected to a metal electrode 44 which is suspended inside a hollow space 45 in wheel 16, better illustrated in Figs. 4 and 5. Metal electrode 44 is suspended in an electrolyte solution 46 shown in Fig. 5 which seeps out through a porous rim 48 and makes good electrical contact with the ground 20 in the trench 18.

As can be seen in Fig. 1, wheel electrode 16 need not necessarily be, but preferably is, spring biased to be urged into good electrical contact with the ground 20 by means of a spring 50.

As can be seen in Fig. 1, wheel electrode 16 need not necessarily be, but preferably is, spring biased to be urged into good electrical contact with the ground 20 by means of a spring 50.

Wheel 16 is suspended from a forked member 52 which is rotatably mounted from the end of a linkage 54. Linkage 54 is rotatably mounted at its opposite end from a bracket 56 fixed to the frame 58 of the vehicle 10. The vehicle 10 is simply a conventional small truck having a hood 60, a steering wheel 62, wheels 64, gear shift 66, and seat 68.

The significance of trench or furrow 18 will be better understood in connection with Figs. 2 and 3. A man is shown excavating trench 18 in Fig. 2. He is shown depositing an electrolyte liquid in the trench 18 at 70 by means of a can 72 in Fig. 3. Trench 18 is preferably dug in line with and directly above pipe 12 before an earth potential survey is made. The second step in this preparatory method is depositing the electrolyte 70 in the trench. This step is performed in order to provide good electrical contact with the rim 48 of the wheel 16. Of course, if desired, the front of vehicle 10 could be mechanized to dig the trench 18 and pour the electrolyte 70 just previous to the movement of wheel 16 at the rear of the vehicle in it.

Figure 5:
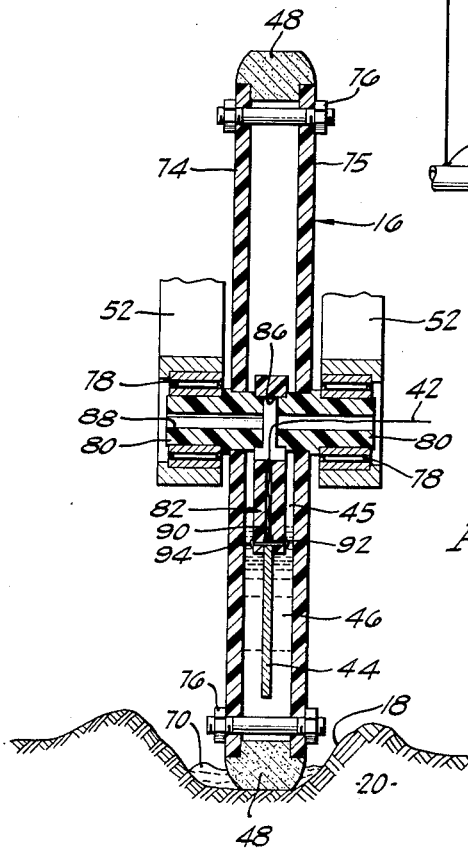
Fig. 5 is a sectional view of the wheel taken on a line 5—5 shown in Fig. 4.

In accordance with the invention, a special wheel electrode 16 is provided which is preferably all made of a dielectric material such as various forms of ceramic or plastic. As shown in Figs. 4 and 5, two discs 74 and 75 are preferably provided and spaced apart on each side of rim 48 and maintained in this position by bolts 76. A portion of the hollow space between plates 74 and 75 is then filled with electrolyte 46. In accordance with the invention, preferably the electrolyte 46 is made of an electrolyte metal salt solution of the same metal of which metal electrode 44 is made. For example, copper sulphate for the electrolyte 46 and a copper electrode 44 are preferably employed. The material of which bolts 76 are made is preferably a non-porous dielectric, such as lucite or nylon. The metal bearings 78 may also be provided on axle halves 80 for the wheel electrode 16. Otherwise, the rest of the construction of wheel electrode 16 is made of a dielectric material. Axles 80 are made of a dielectric material and may extend completely through both discs 74 and 75, although they are shown spaced apart and are actually two spaced halves of a non-integral axle.

In accordance with a special feature of the invention, a bell-shaped member, as indicated at 82, is provided including metal electrode 44. Bell-shaped member 82 includes a dielectric member 84 having a hole 86 disposed transversely through it to fit around axle halves 80. Axle halves 80 are preferably hollow at 88. Lead-in wire 42 extends through axle halves 80 and downwardly through a vertical hole 90 is member 84 to make electrical contact with metal plate 44 that is fixed in a slot 92 in the bottom of member 84 by means of fastening elements 94.

Figure 7:
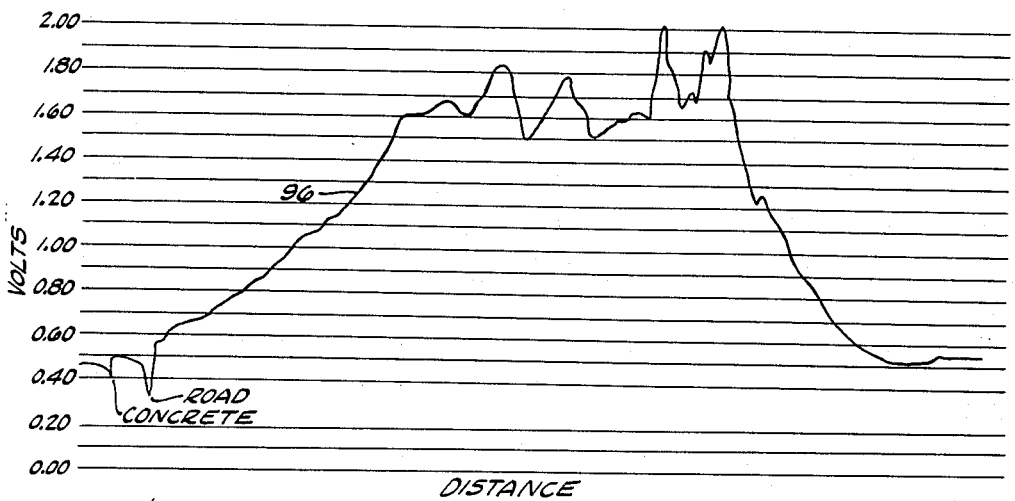
Fig. 7 is a graph of a waveform characteristic of that which may be obtained by practicing the method of the present invention.

In accordance with an aspect of the invention with the use of the special wheel electrode 16, electrolyte 46 always seeks a level at the bottom of the rim 48, i.e., at the earth-contact point 14, and metal electrode 44 also rests in a substantially stationary position as indicated in Figs. 4 and 5 because as the wheel 16 rotates, only axle halves 80 rotate within the hole 86 of member 84 and member 84 and metal electrode 44 remain substantially stationary except for the translational movement of the wheel 16 across the earth 20. At any rate, the member 84 and metal electrode 44 remain substantially stationary with respect to the wheel 16 itself and in a position immersed in electrolyte 44. An example of a graph of pipe to earth potential in volts versus distance which may be obtained through the use of the invention is shown in Fig. 7.

Figure 8:
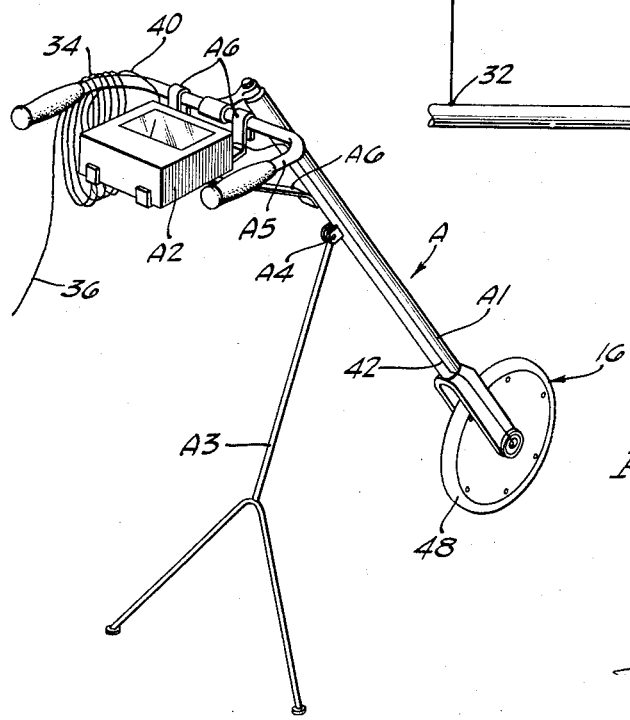
Fig. 8 is a perspective view of manually operable apparatus which may be employed to practice the method of the invention.

Depending upon the amount of surveying required, either the vehicle 10 shown in Fig. 1 or apparatus A shown in Fig. 8 may alternatively be employed, the apparatus A being much less complicated and expensive. Apparatus A includes simply a forked member A1 to rotatably support wheel 16 which may be identical to the wheel 16 shown in Figs. 1, 4 and 5. A lead-in wire 42 is also provided for wheel 16 which is connected to a voltmeter A2 having an output lead and several loops 34 connected to, for example, point 32 on pipe 12 through the input lead extension 36, this connection not being shown in Fig. 8. Forked member A1 may be supported by support means A3 rotatably mounted at A4 on fork member A1. A handle bar A5 is then fixed to fork member A1 and is provided with support means A6 fixed to both fork member A1 and handle bar A5 to support voltmeter A2.

Support means A3 may or may not be provided as desired. Still further support means A3 may be collapsible or rotatable as shown at A4. Support means A3 also may be removable at A4 if desired while an earth potential survey is being made by simply manually carrying apparatus A at handle bar A5 and walking with it while wheel electrode 16 is rolled across the earth.

At this point, it is to be noted that earth potential surveys for underground conductors, such as pipes and cables, are very desirable. However, the invention is by no means limited to this funtcion because interference of underground pipes, the exact location of which is not known, may be determined in graphs, such as the curve 96. In fact, such a graph may be used for many reasons other than simply in conjunction with underground pipe and cable maintenance.

Figure 9:
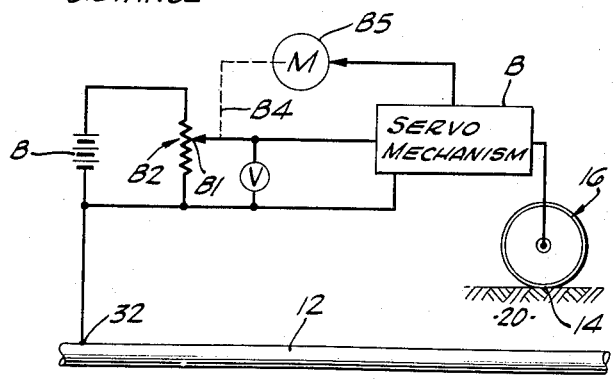
Fig. 9 is a schematic diagram of alternative apparatus which may be used in accordance with the invention.

Although it is not necessary, a servo mechanism as indicated at B in Fig. 9 may be employed to position a movable tap B1 on a potentiometer B2 across which a battery B3 is connected. Tap B1 is then moved until the voltage appearing thereat is equal to the voltage appearing between pipe 12 and point 14 at which wheel electrode 16 touches the ground 20. A recording voltmeter V may then be provided to record the output voltage at tap B1 on potentiometer B2. The tap is moved by a mechanical connection B4 at the output of a motor B5 which is supplied with an input control voltage by servo mechanism B. Thus servo mechanism compares the voltage on tap B1 with the voltage appearing at wheel electrode 16 in such a manner that the voltage read by voltmeter V is always equal to the voltage appearing between pipe 12 and point 14. It is to be noted that the resistance of the pipe 12 will be substantially negligible in comparison to the ground resistance. Hence the resistance of the pipe from point 32 to a point directly under point 14 on the pipe 12 will be substantially negligible in comparison to the resistance of the earth between point 14 and a point on pipe 12 directly below point 14.

Of course, the differences between one point on the earth and other points also on the earth's surface can be measured and recorded with the apparatus of the invention. Thus, it is not limited to corrosion surveys on pipe and cable. See the earlier mentioned corrosion articles.

Although only three specific embodiments have been illustrated and described, it is to be understood that the invention is by no means limited to those shown since they have been shown merely for purposes of illustration. Other changes and modifications of the invention may be made and will, of course, suggest themselves to those skilled in the art. Hence, the invention is not to be limited to the disclosure made, the true scope of the invention being defined only in the appended claims.

What is claimed is:

1. A device for contacting the ground in earth potential surveys, said device comprising: a hollow dielectric wheel having a porous dielectric rim to be saturated with an electrolyte contained therein over the ground to improve electrical contact therewith; and a metal electrode in the hollow space in said wheel in a position to be at least partially immersed in said electrolyte to provide good electrical contact therewith.

2. A device for contacting the ground in earth potential surveys, said device comprising: a hollow dielectric wheel having a porous dielectric rim to be saturated with an electrolyte contained therein over the ground to improve electrical contact therewith; a metal electrode; and means to suspend said electrode in the hollow space of said wheel from the horizontal rotational axis thereof in a position to be at least partially immersed in said electrolyte.

3. A device for contacting the ground in earth potential surveys, said device comprising: a hollow dielectric wheel including two spaced parallel dielectric discs and a porous dielectric enclosing rim disposed around the circumference of said discs between them; an electrolyte at least partially filling the hollow space in said wheel; axle means fixed to said wheel at the center of said discs; a metal electrode; and means to suspend said metal electrode in said electrolyte from said axle means.

4. A device for contacting the ground in earth potential surveys, said device comprising: a hollow dielectric wheel including two spaced parallel dielectric discs and a porous dielectric enclosing rim disposed around the circumference of said discs between them; an electrolyte at least partially filling the hollow space in said wheel; axle means fixed to said wheel at the center of said discs; a metal electrode; and means fixed to said electrode to hook around said axle means to rotatably support said electrode from said axle means in a position to be at least partially immersed in said electrolyte.

5. A device for contacting the ground in earth potential surveys, said device comprising: a hollow ceramic wheel including two spaced parallel ceramic discs and a porous ceramic rim disposed around said discs between them to provide a hollow space inside said wheel; an electrolyte filling less than half of said hollow space; hollow axle means fixed to said discs at their centers; a metal electrode; means to support said metal electrode rotatably from said axle means in a position to be at least partially immersed in said electrolyte; and a wire electrically connected to said electrode and extending upwardly in said hollow space and outwardly through said hollow axle means.

6. A device for use in making earth potential surveys, said device comprising: variable potential means; means to record the output voltage of said variable potential means; fixed means to contact an underground conductor; a hollow wheel for rolling contact with the earth over the conductor, said wheel being hollow and made of dielectric materials including a porous ceramic rim saturated with an electrolyte to improve electrical contact with the ground; and a null-seeking servo mechanism responsive to the output voltage of said variable potential means and to the voltage appearing between said fixed means and the rim of said wheel to vary said variable potential means until the output voltage of said variable potential means is equal to that appearing between said fixed means and the rim of said wheel.

7. A device for contacting the ground in earth potential surveys, said device comprising: a hollow wheel having a porous dielectric rim and an axle mounted at its center; an electrolyte at least partially filling said wheel and saturating said porous dielectric rim; and a metal electrode rotatably mounted from said axle in a position to be at least partially immersed in said electrolyte.

8. A device for contacting the ground in earth potential surveys, said device comprising: a hollow wheel having a porous rim and an axle mounted at its center; an electrolyte at least partially filling said wheel and saturating said porous rim; and a metal electrode rotatably mounted from said axle in a position to be at least partially immersed in said electrolyte.

9. A device for contacting the ground in earth potential surveys, said device comprising: a hollow wheel having a porous rim; an electrolyte at least partially filling said wheel and saturating said porous rim; and an electrode suspended in said wheel in a position to be at least partially immersed in said electrolyte.

10. A device for contacting the ground in earth potential surveys, said device comprising: a hollow wheel having a porous rim; an electrolyte at least partially filling said wheel and saturating said porous rim; and a conductor electrically coupled with said electrolyte.

References Cited in the file of this patent

UNITED STATES PATENTS

| | | |
|---|---|---|
| 736,411 | Leonard | Aug. 18, 1903 |
| 1,163,469 | Schlumberger | Dec. 7, 1915 |
| 2,105,247 | Jakosky | Jan. 11, 1938 |
| 2,192,404 | Jakosky | Mar. 5, 1940 |
| 2,280,327 | Ware | Apr. 21, 1942 |
| 2,322,796 | Fentress | June 29, 1943 |
| 2,378,440 | Scott | June 19, 1945 |
| 2,659,234 | Harrison | Nov. 17, 1953 |
| 2,803,797 | Cowles | Aug. 20, 1957 |